March 22, 1966  K. SCHLICHTING  3,241,179
METHOD OF SLITTING FISH BELLIES
Filed Dec. 16, 1963  2 Sheets-Sheet 1
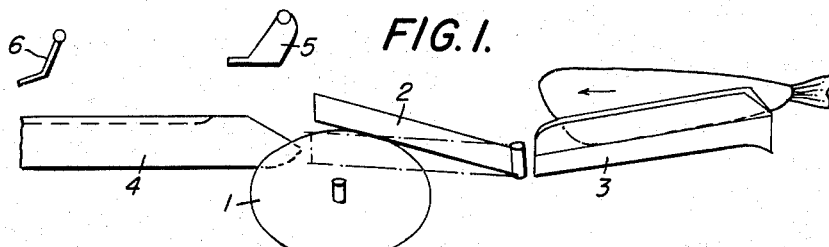
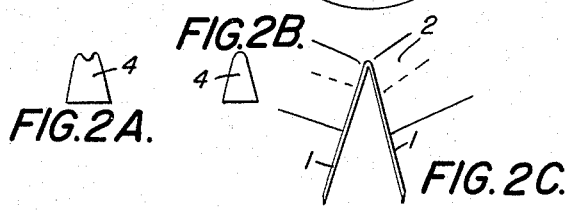
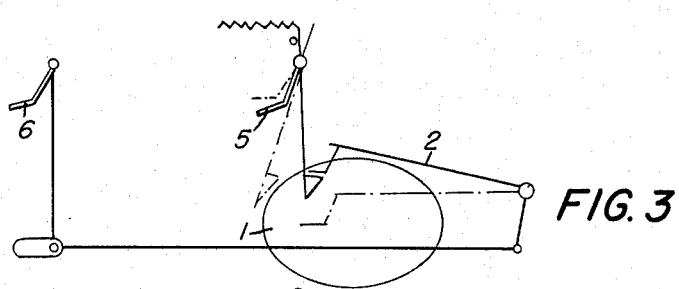
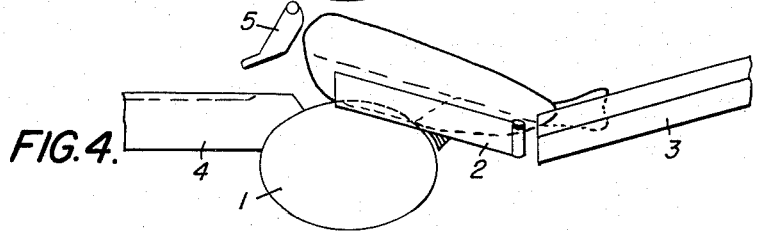
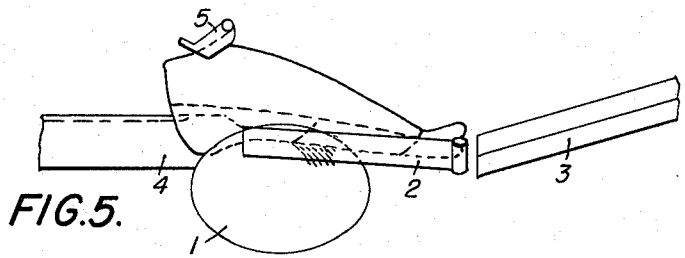
INVENTOR
KARL SCHLICHTING
BY *Richards & Geier*
ATTORNEYS March 22, 1966 K. SCHLICHTING 3,241,179
METHOD OF SLITTING FISH BELLIES
Filed Dec. 16, 1963 2 Sheets-Sheet 2
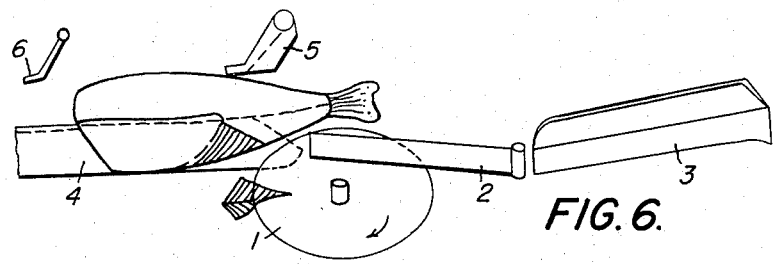
FIG. 6.
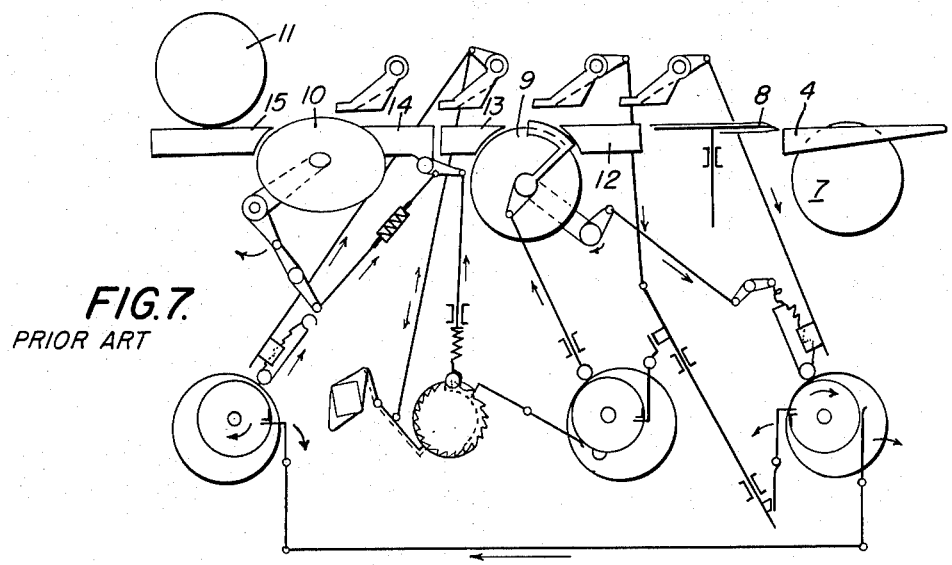
FIG. 7.
PRIOR ART
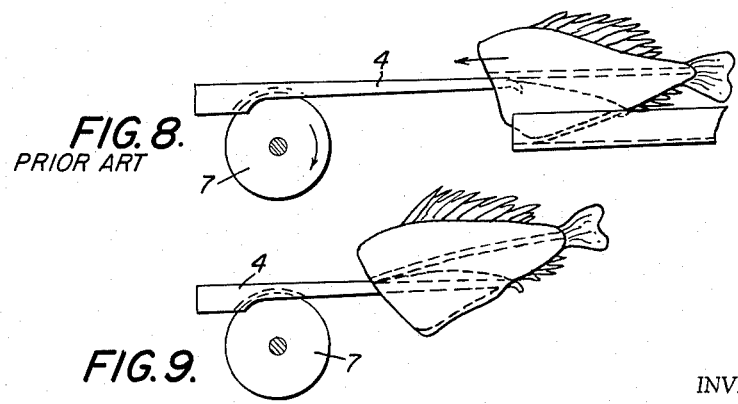
FIG. 8.
PRIOR ART
FIG. 9.
INVENTOR
KARL SCHLICHTING
BY *Richards & Geier*
ATTORNEYS

3,241,179
METHOD OF SLITTING FISH BELLIES
Karl Schlichting, Lubeck, Germany, assignor to Nordischer Maschinenbau Rud. Baader, Lubeck, Germany
Filed Dec. 16, 1963, Ser. No. 330,992
Claims priority, application Germany, Dec. 21, 1962, N 22,515
3 Claims. (Cl. 17—45)

The present invention relates to a method for opening up the rear portion of the belly cavity of fishes and has for its object to prepare properly for further working in filleting machines or the like fishes which have a belly cavity extending back towards the rear.

It is known that there are two fundamentally different types of belly cavities in fishes, namely one type in which the upper margin of the belly cavity extends from the head end first under the backbone and then in a more or less flat curve to the anus and another type in which the upper margin extends right along the underside of the backbone towards the rear far beyond the region of the anus, whence a front wall extends back at an incline in forward direction to the anus. This produces a rearwardly projecting pocket which makes it difficult not only to clean the belly cavity but also to guide the fish during the further treatment.

These difficulties in guiding occur particularly when, for example in a filleting machine, a spike penetrates from the head end under the backbone into the belly cavity and the fish is to slide over the saddle guide following the spike. Fishes with a rearwardly projecting belly cavity cannot be worked on these machines because the spike penetrating the belly cavity merely sticks in the rearwardly projecting pocket of the belly cavity so that the fish becomes jammed entirely or has to be moved on by force. Fishes with a belly cavity extending in a curve to the anus pass the spike without difficulty even when the belly cavity is opened up, because the spike merely forces its way out through the anus again.

The object of the method according to the invention is to overcome these difficulties, it being taken into consideration that the same condition as regards the guide path available for the spike or other guiding elements engaging the belly cavity must be produced for all fishes. This is attained in that, according to the invention, the belly strips extending to the rear from the belly cavity are cut away together with the rear under fin and its supports. Thus the rear portion of the belly side of the fish is opened up so that the upper margin strips following the belly cavity extend in a similar way to the margin strips extending to the anus. As a result perfect guiding is ensured even in the case of spikes followed by saddle-like guides, quite apart from the fact that easy cleaning of the belly cavity is now possible in the case of all fish.

It is evident that it is possible and advantageous to split open in a single working operation first the belly cavity or cut out a corresponding strip and then to sever the belly strip extending therefrom. The whole belly side of the fish has then been opened up in a single operation so that the fish can be subjected to any desired treatment.

The new method can obviously also be used for all kinds of fish because the removal of the additional strip when opening up the rear portion of the belly side facilitates further working. It is advantageous to feed the fish to a swivel double guide forming a trough or channel and to lower it on to a pair of "butcher" knives by swinging the two guide halves downwards and laterally outwards.

If the fish is to be subsequently filleted, it is possible to carry out the cut according to the invention at the same time as the filleting cut, namely the cut which is effected by the pair of so-called butcher knives for severing the belly strip following the belly cavity can be carried out so that the backbone is at the same time laid free on the belly side from the end of the belly cavity to the tail.

The double guide is preferably controlled so that a feeler operated by the leading end of the fish effects the swinging apart of the two guide parts and the downward movement thereof. For swinging the parts back into their initial or rest position a second feeler is preferably used which is also operated by the end of the fish moving ahead.

It is evident that the return movement can also be effected by the first feeler returning into its initial or rest position. If it is desired to cut free at the same time the portion of the backbone on the belly side from the end of the belly cavity to the tail end of the fish, the controlling feeler is preferably used at the same time as measuring feeler, the double guide being then locked in its rest position during this operation.

The apparatus for carrying out the method according to the invention is extremely simple as only a horizontally and vertically pivoted double guide forming a trough or channel is required, under which a pair of rotary knives is provided which are alternately covered or exposed by the double guide, and above which guide a feeler lever coupled therewith is provided for controlling the double guide. A second feeler may be provided for returning the double guide into its initial or rest position. The pair of knives preferably consists of two circular knives standing at an acute angle to each other. If the backbone is to be cut free on the belly side, two coaxial, that is parallel circular knives are used which are arranged at a distance apart and controlled by the measuring feeler.

To explain the method more clearly, an embodiment of the invention is hereinafter described with reference to the accompanying drawings which show diagrammatically the construction of the apparatus without structural details which are obvious to anyone versed in the art.

In the drawing:

FIGURE 1 shows diagrammatically and in side view an apparatus for slitting fish bellies, the fish being shown as it approaches the knives.

FIGURE 2 is a side view of the outer guide member of the apparatus of this invention.

FIGURE 2a is a front view of the saddle guide member of the apparatus of this invention.

FIGURE 2b is a side view of the saddle guide member of this invention.

FIGURE 2c is a side view of the double guide member and the circular knives of this invention.

FIGURE 3 is a diagram illustrating the switching of the apparatus.

FIGURE 4 is similar to FIG. 1 but shows the fish immediately prior to the cutting operation.

FIGURE 5 is similar to FIG. 1 but shows the fish during the cutting operation.

FIGURE 6 is similar to FIG. 1 but shows the fish after the completion of the cutting operation.

FIGURE 7 is a diagram illustrating a prior art apparatus which may be used for filleting fish which was slit in accordance with the present invention.

FIGURE 8 is a diagram illustrating the manner in which a spike-like point of a saddle guide penetrates the belly cavity of the fish.

FIGURE 9 is similar to FIG. 8 but shows the spike-like point as it passes out of the fish.

The apparatus comprises a pair of circular knives 1 standing at an acute angle to each other and which can be covered or exposed by a double guide 2. The circular knives 1 are, as shown in FIG. 6, to cut out the belly strip located at the rear of the anus to the rearwardly projecting end of the belly cavity together with the rear under fin and its supports. In the arrangement shown in FIG. 1 the tools 1, 2 are following an outer guide 3 and in front of a saddle guide 4. FIG. 2 shows side views of the parts 1 to 4 while FIG. 3 is a switching diagram which is understandable without further explanation. A length feeler designated by 5 is actuated, for example, by the head end of the fish moving in advance for releasing the guide 2. This release takes place when the advance end of the fish is at least over the middle of the knives so that the stump of the backbone cannot run up against the knives, but before the end of the belly cavity has reached the cutting edge of the knife. If the belly cavity is also to be cut open, the pair of knives must obviously cut correspondingly sooner.

When the fish has passed through, the catch of the feeler 5 is in a position ready to lock the guide 2 again. This takes place when the guide is again raised and can be effected, as shown in FIG. 3, by a feeler 6 which is swung by the fish as it continues along its path of travel. FIG. 4 shows the position of the fish before the feeler 5 is operated. FIG. 5 the position of the fish after the guide 2 has been released during the cutting operation and FIG. 6 the position of the fish before it reaches the return feeler 6, the cut effected being indicated by cross-hatching. In the example illustrated, the fish is not yet cut open up to the backbone. The wedge cut out is shown under FIG. 6.

If the backbone is to be cut free on the belly side from the end of the belly cavity to the root of the tail, a pair of coaxial or parallel knives is used instead of the knives 1 standing at an acute angle to each other. It will be apparent that no strips can be cut out completely but that these strips with the rear under fin and fin supports remain adhering to the bone skeleton.

To make it clear how the further working of the fish treated by the method according to the invention takes place and what purpose the method according to the invention serves, a filleting operation known in prior art is shown entirely diagrammatically in FIG. 7. The saddle guide 4 shown in FIG. 1 is the first guide in the filleting operation. If the belly cavity is not yet cut open a rotary circular knife 7 performs this function, a rotary circular knife 8 serves for cutting off the belly flaps, while pairs of knives 9, 10 and 11 effect the filleting cuts in known manner. The necessary guides 12 to 15 are provided between the tools.

The manner in which the saddle guide 4 operates is shown in FIGS. 8 and 9, whereby for the sake of simplicity, a fish is shown without a belly cavity projecting at the rear end, because this fish passes over the saddle guide 4 contructed as a spike in exactly the same way as a fish prepared according to the present method in which the wedge formed by the rearwardly projecting end of the belly cavity is removed. As can be seen from FIG. 8, the spike-like point of the saddle guide 4 penetrates the belly cavity from the head end below the stump of the backbone so that the fish rides on the saddle guide 4 as it moves along. The spike point then passes out through the anus of the fish as shown in FIG. 9. The belly cavity is then cut open by the rotating circular knife 7 (see FIG. 7). If this has already been done during the preparation according to the invention, the knife 7 no longer becomes operative.

It clearly follows that when prepared according to the invention, fishes having a pocket extending from the rear end of the belly cavity, can also be worked on the same machines which are used for dressing other kinds of fishes.

What I claim is:

1. Method for opening up the rear portion of the belly side of fishes, comprising severing the belly strips extending towards the rear from the belly cavity together with the rear under fin and the fin supports by two angularly related cuts extending from the belly side toward, but short of, the backbone of the fish.

2. Method according to claim 1, wherein in the same operation the belly cavity is first split open to the anus and then the belly strips are subsequently severed.

3. The method according to claim 1, wherein the severing of the belly strips extends towards the rear from the belly cavity to the tail.

References Cited by the Examiner

UNITED STATES PATENTS

| | | | |
|---|---|---|---|
| 1,402,982 | 1/1922 | Webb et al. | 17—4 |
| 2,110,416 | 3/1938 | David et al. | 17—4 |
| 2,246,839 | 6/1941 | Christiansen | 17—4 |
| 2,521,241 | 9/1950 | Minaker | 17—4 |
| 2,771,633 | 11/1956 | Bartels et al. | 17—45 |
| 2,955,316 | 10/1960 | Danielsson | 17—4 |
| 2,968,061 | 1/1961 | Eubanks | 17—45 |
| 3,082,094 | 3/1963 | Kramer | 99—111 |

SAMUEL KOREN, *Primary Examiner.*

LUCIE H. LAUDENSLAGER, *Examiner.*